United States Patent
Demidov et al.

(10) Patent No.: US 12,139,996 B2
(45) Date of Patent: Nov. 12, 2024

(54) METHODS FOR DETERMINING POSITIONS OF FLUID INTERFACES AND DETECTING CEMENT SETTING IN A SUBTERRANEAN WELLBORE

(71) Applicant: Schlumberger Technology Corporation, Sugar Land, TX (US)

(72) Inventors: Demid Valeryevich Demidov, Novosibirsk (RU); Roman Vladimirovich Korkin, Sugar Land, TX (US); Andrey Vladimirovich Fedorov, Novosibirsk (RU); Artem Valeryevich Kabannik, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/256,942

(22) PCT Filed: Dec. 14, 2020

(86) PCT No.: PCT/RU2020/000679
§ 371 (c)(1),
(2) Date: Jun. 12, 2023

(87) PCT Pub. No.: WO2022/131945
PCT Pub. Date: Jun. 23, 2022

(65) Prior Publication Data
US 2024/0035355 A1 Feb. 1, 2024

(51) Int. Cl.
*E21B 33/14* (2006.01)
*E21B 47/005* (2012.01)
(Continued)

(52) U.S. Cl.
CPC ............ *E21B 33/14* (2013.01); *E21B 47/005* (2020.05); *E21B 47/047* (2020.05); *G01V 1/50* (2013.01)

(58) Field of Classification Search
CPC ........ E21B 33/14; E21B 47/005; E21B 47/04; E21B 47/047; E21B 47/107; E21B 47/16
See application file for complete search history.

(56) References Cited

U.S. PATENT DOCUMENTS 2,213,486 A * 9/1940 Dale ...................... G01F 23/241
340/854.3
4,703,427 A * 10/1987 Catala ...................... G01V 1/50
181/105
(Continued)

FOREIGN PATENT DOCUMENTS

EP 0263028 A2 * 4/1988 ............... G01V 1/40
WO 2014099066 A1 6/2014
(Continued)

OTHER PUBLICATIONS

Office Action issued in Eurasian patent application 202391767 on Jul. 24, 2023, 4 pages.
(Continued)

*Primary Examiner* — Jennifer H Gay
(74) *Attorney, Agent, or Firm* — Jeffrey D. Frantz (57) ABSTRACT

Methods for locating fluid interfaces in a cased wellbore include generating vibrations in the casing, thereby forming oscillations in the wellbore fluids and the casing. The oscillations are detected by a vibration detector. The oscillations are recorded by a data acquisition system. Mathematical processing of the oscillations by cepstrum analysis is performed to determine the depths of interfaces between fluids in the annulus. The methods may also be employed to
(Continued)

determine the time at which a cement slurry begins to set and harden. The methods may be performed in real time.

14 Claims, 10 Drawing Sheets

(51) Int. Cl.
*E21B 47/047* (2012.01)
*G01V 1/50* (2006.01)

(56) References Cited

U.S. PATENT DOCUMENTS

| | | | | |
|---|---|---|---|---|
| 4,896,303 | A * | 1/1990 | Leslie | G01V 1/50 |
| | | | | 702/6 |
| 9,388,685 | B2 * | 7/2016 | Ravi | E21B 47/107 |
| 9,546,548 | B2 | 1/2017 | Hartog | |
| 10,502,854 | B2 * | 12/2019 | Mandal | E21B 47/00 |
| 10,677,048 | B2 * | 6/2020 | Roberson | E21B 47/12 |
| 10,738,590 | B2 | 8/2020 | Ravi | |
| 2006/0198243 | A1 * | 9/2006 | Tang | E21B 47/005 |
| | | | | 367/35 |
| 2012/0205103 | A1 * | 8/2012 | Ravi | E21B 33/14 |
| | | | | 166/285 |
| 2014/0180592 | A1 * | 6/2014 | Ravi | E21B 47/107 |
| | | | | 702/11 |
| 2015/0177404 | A1 * | 6/2015 | Pabon | G01V 1/46 |
| | | | | 367/28 |
| 2017/0205524 | A1 * | 7/2017 | Mandal | E21B 47/005 |
| 2018/0003036 | A1 * | 1/2018 | Roberson | E21B 47/13 |
| 2023/0304395 | A1 * | 9/2023 | Kabannik | E21B 47/06 |
| 2024/0035355 | A1 * | 2/2024 | Demidov | E21B 47/04 |

FOREIGN PATENT DOCUMENTS

| | | | |
|---|---|---|---|
| WO | WO-2016144349 A1 * | 9/2016 | E21B 47/10 |
| WO | 2016191029 A1 | 12/2016 | |
| WO | 2018004369 A1 | 1/2018 | |

OTHER PUBLICATIONS

Office Action issued in Eurasian patent application 202391767 on Feb. 22, 2024, 4 pages.
International Search Report and Written Opinion issued in International Patent application PCT/RU2020/000679 on Aug. 15, 2021, 6 pages.
Leugemors E et al.: "Cementing Equipment and Casing Hardware," in Nelson EB and Guillot D (eds.): Well Cementing—2nd Edition, Houston, Schlumberger (2006) 343-458.
Piot B and Cuvillier G: "Primary Cementing Techniques," in Nelson EB and Guillot D (eds.): Well Cementing—2nd Edition, Houston, Schlumberger (2006) 459-501.
Trogus et al., "Studies of Cement Wiper Plugs Suggest New Deepwater Standards," paper SPE/IADC-173066-MS, presented at the SPE/IADC Drilling Conference and Exhibition, London, UK, Mar. 17-19, 2015, 9 pages.
Stewart et al., "Nonintrusive Determination of Top of Cement and Wellbore Blockage Depth Using Pressure Wave Analysis," SPE-191320-MS, Paper presented at the SPE Norway One Day Seminar, Bergen, Norway, Apr. 2018, 10 pages.
Lorentzen et al.: Underbalanced and Low-head Drilling Operations: Real Time Interpretation of Measured Data and Operational Support, Society of Petroleum Engineers, paper SPE-71384-MS, Paper presented at the SPE Annual Technical Conference and Exhibition, New Orleans, Louisiana, Sep. 2001, 12 pages.

* cited by examiner

METHODS FOR DETERMINING POSITIONS OF FLUID INTERFACES AND DETECTING CEMENT SETTING IN A SUBTERRANEAN WELLBORE

CROSS-REFERENCE TO RELATED APPLICATIONS

This application is a National Stage Entry of International Application No. PCT/RU2020/000679, filed on Dec. 14, 2020.

TECHNICAL FIELD

The present disclosure relates generally to cementing operations. In particular, the disclosure relates to using vibrations and oscillations in a tubular body to determine the positions of fluid interfaces in the annulus between the tubular body and a wellbore wall. The disclosed methods may also be employed to detect when a cement slurry is setting.

BACKGROUND

During the construction of underground wells, it is common, during and after drilling, to place a tubular body such as a liner or casing, secured by cement pumped into the annulus around the outside of the tubular body. The cement serves to support the tubular body and to provide isolation of the various fluid-producing zones through which the well passes. This latter function prevents cross-contamination of fluids from different layers. For example, the cement prevents formation fluids from entering the water table and polluting drinking water, or prevents water from passing into the well instead of oil or gas. Furthermore, the cement sheath helps prevent corrosion of the tubular body.

Figure 1:
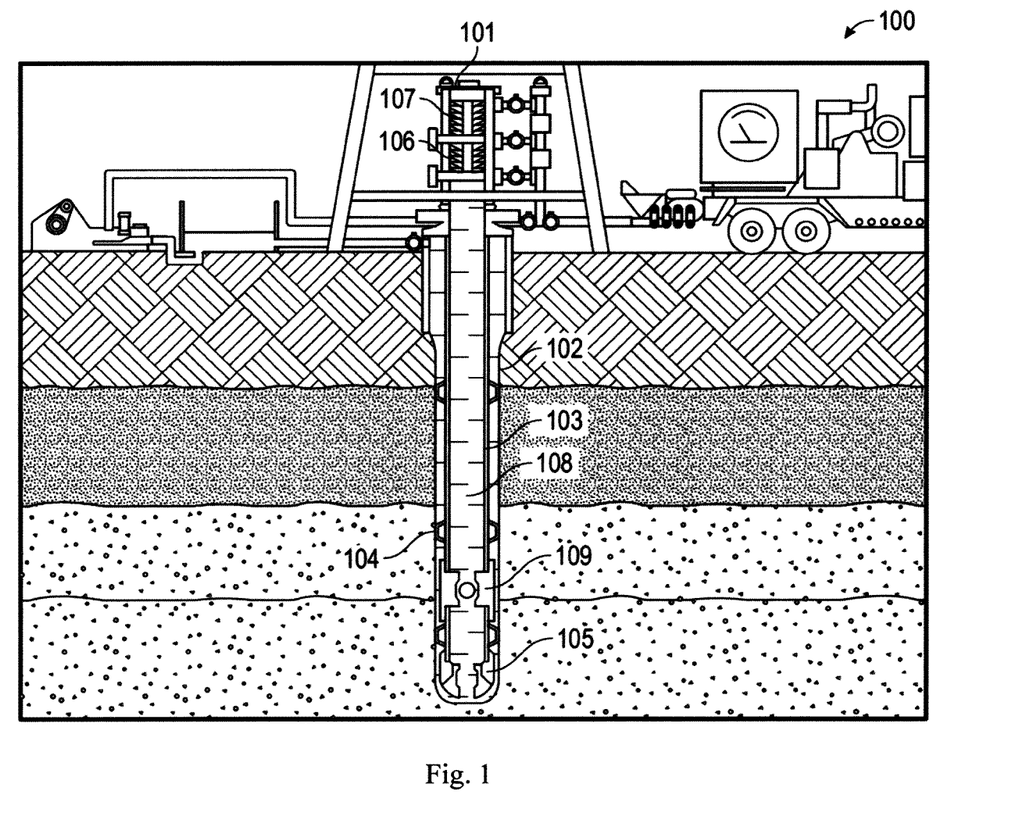
FIG. 1 shows a typical wellsite configuration during a cementing operation.

The cement placement process is known in the industry as primary cementing. Most primary cementing operations employ the two-plug cement-placement method. FIG. 1 shows a typical wellsite configuration 100 for a primary cementing operation. A cementing head 101 is situated on the surface, and a casing string 103 is lowered into a borehole 102. As the casing string 103 is lowered into the borehole 102, the casing string interior fills with drilling fluid 108. The casing string is centered in the borehole by centralizers 104 attached to the outside of the casing string. Centralizers are placed in critical casing sections to prevent sticking while the casing is lowered into the well. In addition, they keep the casing string in the center of the borehole to help ensure placement of a uniform cement sheath in the annulus between the casing and the borehole. The bottom end of the casing string is protected by a guide shoe 105 and a float collar 109. Guide shoes are tapered, commonly bullet-nosed devices that guide the casing toward the center of the hole to minimize hitting rough edges or washouts during installation. The guide shoe differs from the float collar in that it lacks a check valve. The check valve in a float collar can prevent reverse flow, or U-tubing, of fluids from the annulus into the casing. Inside the cementing head 101 are a bottom cementing plug 106 and a top cementing plug 107. The cementing plugs, also known as cementing wiper plugs or wiper plugs, are elastomeric devices that provide a physical barrier between different fluids as they are pumped through the casing string interior. Most cementing plugs are made of a cast aluminum body with molded rubber fins than ensure steady movement through a tubing.

The goals of the primary cementing operation are to remove drilling fluid from the casing interior and borehole, place a cement slurry in the annulus, and leave the casing interior filled with a displacement fluid such as brine or water. The bottom cementing plug 106 separates the cement slurry from the drilling fluid, and the top cementing plug 107 separates the cement slurry from the displacement fluid.

Cement slurries and drilling fluids are usually chemically incompatible. Commingling may result in a thickened or gelled mass at the interface that would be difficult to remove from the wellbore, possibly preventing the placement of a uniform cement sheath throughout the annulus. Therefore, in addition to using wiper plugs, engineers employ both chemical means to maintain fluid separation. Chemical washes and spacer fluids may be pumped between the cement slurry and drilling fluid. These fluids have the added benefit of cleaning the casing and formation surfaces, which is helpful for achieving good bonding with the cement.

Figure 2:
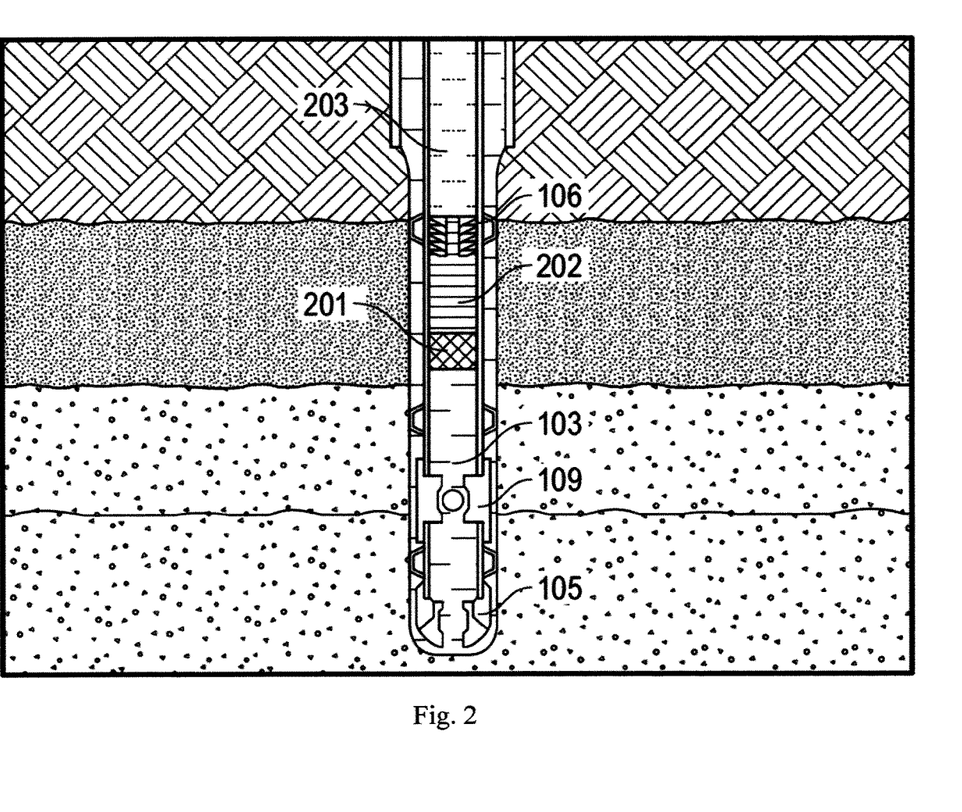
FIG. 2 shows a cementing operation in progress. The bottom cementing plug has been released, separating the cement slurry from chemical washes, spacer fluids and drilling fluid.
Figure 3:
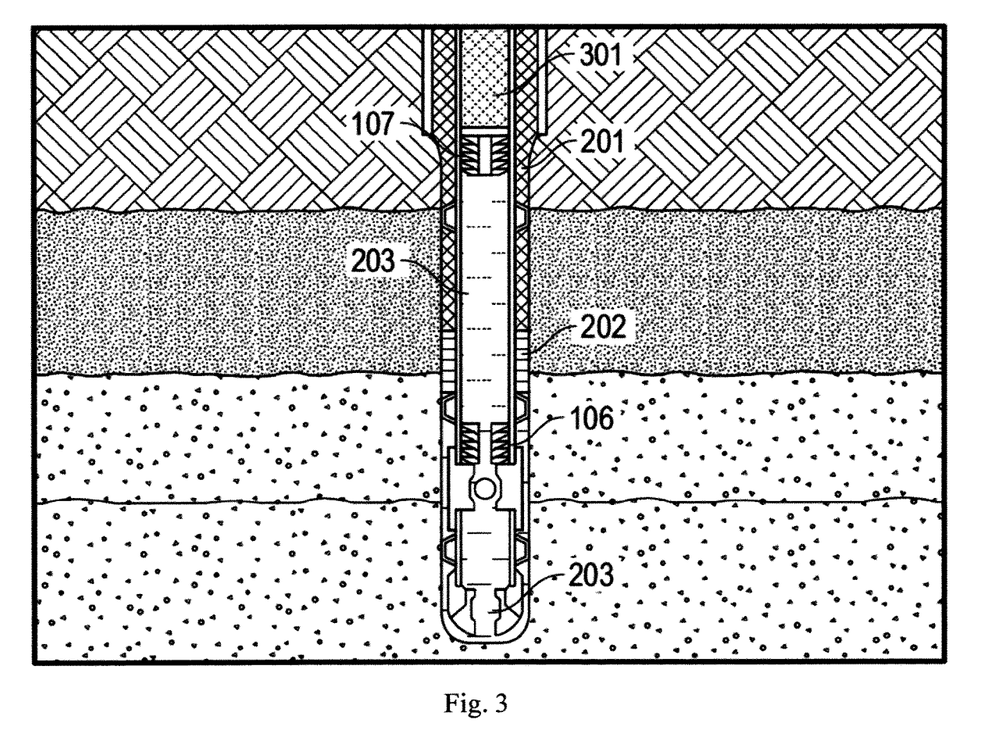
FIG. 3 shows a cementing operation in progress. The bottom cementing plug has landed on the float collar. A membrane in the bottom cementing plug ruptures, allowing cement slurry to enter the annulus between the casing string and the borehole wall.

FIG. 2 shows a chemical wash 201 and a spacer fluid 202 being pumped between the drilling fluid 108 and the bottom cementing plug 106. Cement slurry 203 follows the bottom cementing plug. The bottom cementing plug has a membrane that ruptures when it lands at the bottom of the casing string, allowing cement slurry to pass through the bottom cementing plug and enter the annulus (FIG. 3).

Figure 4:
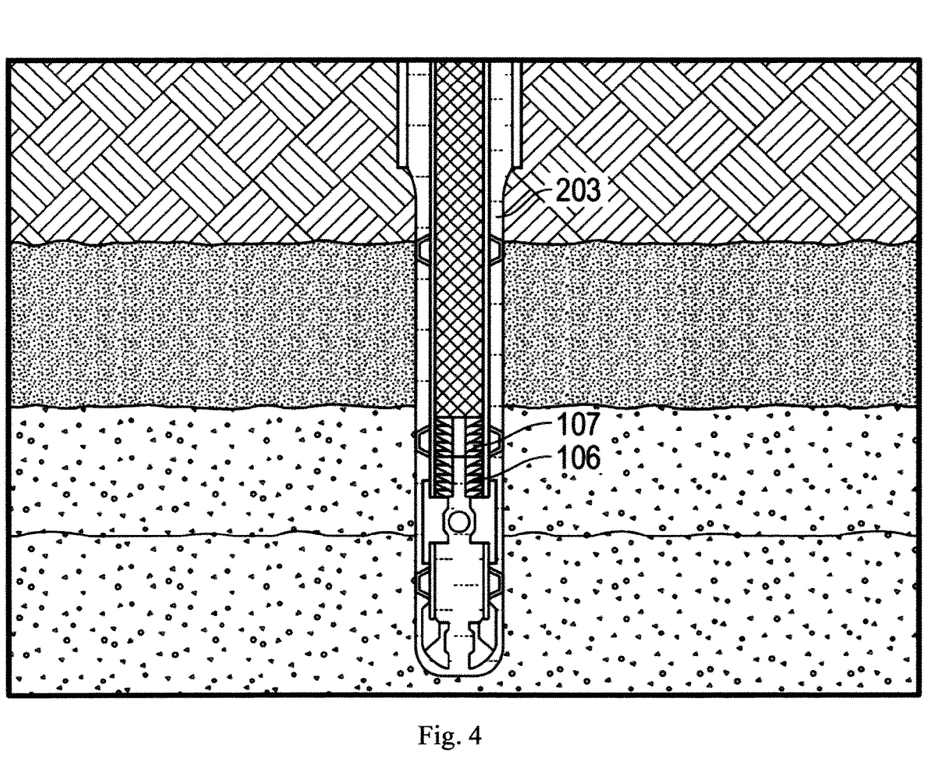
FIG. 4 shows a completed cementing operation. Cement slurry fills the annulus, both cementing plugs have landed on the float collar, and the interior of the casing string is filled with displacement fluid.

Once a sufficient volume of cement slurry has been pumped to fill the annular region between the casing string and the borehole wall, the top cementing plug 107 is released, followed by the displacement fluid 301. The top cementing plug 107 does not have a membrane; therefore, when it lands, hydraulic communication is severed between the casing interior and the annulus (FIG. 4). After the cementing operation, engineers wait for the cement to set and develop strength—known as "waiting-on-cement" (WOC). After the WOC time, further operations such as drilling deeper or perforating the casing string may commence.

Conventional cementing plugs are pumped directly from the surface because they pass through only one pipe with a continuous inside diameter (ID). Liners, on the other hand, do not begin at the surface; instead, they are run downhole on the drillstring to the setting depth. Liners typically have a much larger ID than the drillstring; as a result, a single cementing plug cannot be pumped from the surface. Therefore, the displacement is performed by two plugs. One plug, known as the drillpipe dart, is located in the surface cementing equipment. The second plug is either attached to the bottom of the liner setting tool assembly, or the top of the liner setting tool assembly. The second plug is called a liner wiper plug.

After the cement has been pumped in the liner and the drillstring, the drillpipe dart (a droppable object) is released from the surface cementing equipment. When the drillpipe dart reaches the top of the liner, it latches into the liner wiper plug. Both the drillpipe dart and the liner wiper plug then become a single divider between the cement slurry and the displacement fluid. This arrangement may be seen in extended-reach wells and multistage cementing applications.

Additional information concerning cementing plugs, drillpipe darts and primary cementing operations may be found in the following publications. Leugemors E et al.: "Cementing Equipment and Casing Hardware," in Nelson E B and Guillot D (eds.): *Well Cementing-2$^{nd}$ Edition*, Houston, Schlumberger (2006) 343-458. Piot B and Cuvillier G: "Primary Cementing Techniques," in Nelson E B and Guillot D (eds.): *Well Cementing-2$^{nd}$ Edition*, Houston, Schlumberger (2006) 459-501. Trogus M: "Studies of Cement Wiper Plugs Suggest New Deepwater Standards," paper SPE/IADC-173066-MS, presented at the SPE/IADC Drilling Conference and Exhibition, London, UK, 17-19 Mar. 2015.

Deviations from the idealized cementing operation depicted above may occur. Possible reasons include borehole rugosity leading to inaccurate displacement volume calculations, pump rate fluctuations, differences between nominal and actual casing geometry, lost circulation, casing deformation and fluid loss. With these uncertainties, operators and engineers are motivated to achieve real-time monitoring of cementing plug positions, as well as locate the top of the cement (TOC) sheath in the annulus.

SUMMARY

In an aspect, embodiments relate to methods for locating fluid interfaces in a cased wellbore. A cased wellbore is provided, thereby forming an annulus between casing and the borehole. More than one fluid is pumped from the bottom of the annulus toward the top of the annulus, thereby creating an interface between two fluids. Vibrations are generated in the tubular body, thereby forming oscillations in the fluids and the casing. The oscillations are detected by a vibration detector, and analyzed by a data acquisition system. Mathematical processing is performed to determine the depths of the interfaces between fluids in the annulus.

In a further aspect, embodiments relate to methods for determining cement setting time. A cased wellbore is provided, thereby forming an annulus between the casing and the borehole. More than one fluid is pumped from the bottom of the annulus toward the top of the annulus, wherein on of the fluids is a cement slurry. Vibrations are generated in the tubular body, thereby forming oscillations in the fluids and the casing. The oscillations are detected by a vibration detector, and analyzed by a data acquisition system. Mathematical processing is performed to determine when the cement slurry has set.

DETAILED DESCRIPTION

At the outset, it should be noted that in the development of any such actual embodiment, numerous implementations-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

This disclosure pertains to detecting the positions of fluid interfaces in the annulus of a cased wellbore. This disclosure further pertains to detecting the position of the top of cement (TOC) in the annulus, and when a cement slurry has set and begun to harden.

In an aspect, embodiments relate to methods for locating fluid interfaces in a cased wellbore. A cased wellbore is provided, thereby forming an annulus between casing and the borehole. More than one fluid is pumped from the bottom of the annulus toward the top of the annulus, thereby creating an interface between two fluids. Vibrations are generated in the tubular body, thereby forming oscillations in the fluids and the casing. The oscillations are detected by a vibration detector, and analyzed by a data acquisition system. Mathematical processing is performed to determine the depths of one or more interfaces between fluids in the annulus. The methods and measurements disclosed herein may be performed in real time during a cementing operation.

In a further aspect, embodiments relate to methods for determining cement setting time. A cased wellbore is provided, thereby forming an annulus between the casing and the borehole. More than one fluid is pumped from the bottom of the annulus toward the top of the annulus, wherein on of the fluids is a cement slurry. Vibrations are generated in the tubular body, thereby forming oscillations in the fluids and the casing. The oscillations are detected by a vibration detector, and analyzed by a data acquisition system. Mathematical processing is performed to determine when the cement slurry has set. The methods and measurements disclosed herein may be performed in real time during a cementing operation.

Determination of TOC using pressure pulse reflections is mentioned in the following publication. Stewart N and Graham J: "Nonintrusivie Determination of Top of Cement and Wellbore Blockage Depth Using Pressure Wave Analysis, Society of Petroleum Engineers, paper SPE-191320-MS (2018). The method is based on artificial generation of pressure pulses in annular space of cased well and detection of their reflections with a data logging system. The data logger connected to the well at a location close to a pulse generator records the pressure changes caused by the pressure wave reflecting from significant geometrical changes in the well, in particular, from the top of set cement.

Lorentzen R J et al.: "Underbalanced and Low-head Drilling Operations: Real Time Interpretation of Measured Data and Operational Support, Society of Petroleum Engineers, paper SPE-71387-MS (2001), describes post-cementing quality control using recorded data from Top Cement Pulsation (TCP). In this method small hydraulic pressure pulses (usually 100 psi.) are applied repeatedly at the surface into the casing annulus starting immediately after cement placement until the end of the cement transition time. The volumes of water pumped into the annulus and returned during TCP is monitored and converted to a Top Cement Displacement Record (TCDR). Then the record is be analyzed to determine fluid loss volume, initial/final position of top of cement and identify problems such as high fluid loss, bridging; and the presence of high temperature zones.

A method and system for locating downhole objects that reflect a hydraulic signal are disclosed in the following patent application. Kabannik A: "Method and System for Locating Downhole Objects Which Reflect a Hydraulic Signal, Application No. WO 2018/004369 (2018). The monitoring of the well is based on cepstral analysis of pressure data recorded at the wellhead. It is designed to locate downhole objects that reflect a hydraulic signal. A hydraulic signal is detected by a pressure sensor, then the pressure data are processed to obtain their properties such as tube wave reflection times. One (but not the only) method of obtaining such information is a cepstrum analysis. The cepstrum analysis is widely used in various applications, for example for hydraulic fracturing operations monitoring. The cepstrogram allows detection of objects that reflect the hydraulic signal. This method for hydraulic fracturing operations uses hydraulic signal sources including the water hammer effect, noise from surface or submersible pumps and perforating events.

U.S. Pat. No. 9,546,548 discloses a device and a method of use for cement sheath analysis based on acoustic wave propagation. It consists of an acoustic wave detection apparatus, comprising a fiber optic cable drawn down in a well, an optical source and a data acquisition system. The acoustic source produces a compressional wave in a casing string. The pressure in the annulus is determined as the cement slurry sets, and this pressure is compared to the maximum formation pressure as an indication of whether the cement had set to a strength, enough to maintain an effective formation-to-casing seal across the annulus.

U.S. Pat. No. 10,738,590 describes techniques whereby, while pumping the cement slurry, the position of the top of the cement slurry in the annulus is sensed, and the rise of the sensed position of the top of the cement slurry in the annulus is recorded as a function of time. The recording is analyzed to evaluate the cement job. For example, the analysis may indicate a problem addressed by adjusting a cement plan for a future cementing operation, and the analysis may indicate a need to repair a location of the set cement by perforating the well casing at the location to be repaired, and pumping cement slurry down the well casing to fill the location to be repaired.

The disclosed method involves generating vibrations in well casing while the well is being cemented and employing an accelerometer to detect the vibrations. The vibrations may be generated by cementing or rig pumps while pumping a fluid into wellbore or with the use of some special vibrators installed on the well, including hammers or piezoelectric transducers. The accelerometer signal is processed to determine oscillation frequencies of the casing during the cementing operation. Mathematical processing may also then be applied to determine the top of cement (TOC) position as well as to confirm cement setting.

In one embodiment of the method the analysis of the casing string vibrations is used for determination of the cement state and its setting confirmation. The disclosed method employs an assembly that comprises a borehole, fluid-filled casing string run into borehole, a vibration detector (accelerometer) installed at the casing string at the surface, an acquisition system for data recording from the detector. The accelerometer may have one or more components, and may operate in a frequency range between 1 Hz and 5.12 kHz.

The disclosed method employs an assembly (FIGS. 5A-5C) that comprises a wellhead 101, a borehole 102, a casing string 103 run into the borehole, a vibration generator 501 installed at the wellhead, an vibration detector 502 and a data acquisition system 503. In FIG. 5A, a cementing plug 505 is traveling down the interior of the casing string, and spacer fluid 108 is being displaced in the annulus by a cement slurry 203. The drilling fluid and cement slurry are separated by an interface 504. At a given point in time, both the spacer fluid and cement slurry have heights ($h_{spacer}$ and $h_{cem}$, respectively) in the annulus. The vibration generator forms oscillations 506 in the annulus and along the casing string. As the fluid interface travels toward the top of the annulus, the oscillations vary (FIG. 5B). Finally, when the cementing plug has landed (FIG. 5C), the oscillations stabilize. Later, as the cement slurry begins to set, the nature of the oscillations changes again.

Casing vibrations are induced during the cement setting process and the response is recorded by the vibration detector (e.g., an accelerometer). Casing vibrations may by induced by using any vibrator physically connected to the casing string such as pumps or a piezoelectric generator, or by manually hitting the casing with a hammer. Vibration initiation may be performed continuously or periodically. The signal from the accelerometer may then be recorded by an acquisition system with a computer and then mathematically processed to obtained oscillation frequency spectra. The conclusion on a cement state is then performed based on the set of spectra obtained during a period that is expected for cement setting. During setting and hardening, cement undergoes a transition from a liquid slurry form to a solid; hence, the transition influences the oscillation of the casing string. When the cement is in the form of a slurry, casing oscillation has exact oscillation frequencies but along with cement thickening these frequencies shift and then go to the plateau when cement finally sets. The moment of when frequencies shift reaches the plateau evidences that cement has set.

Figure 6:
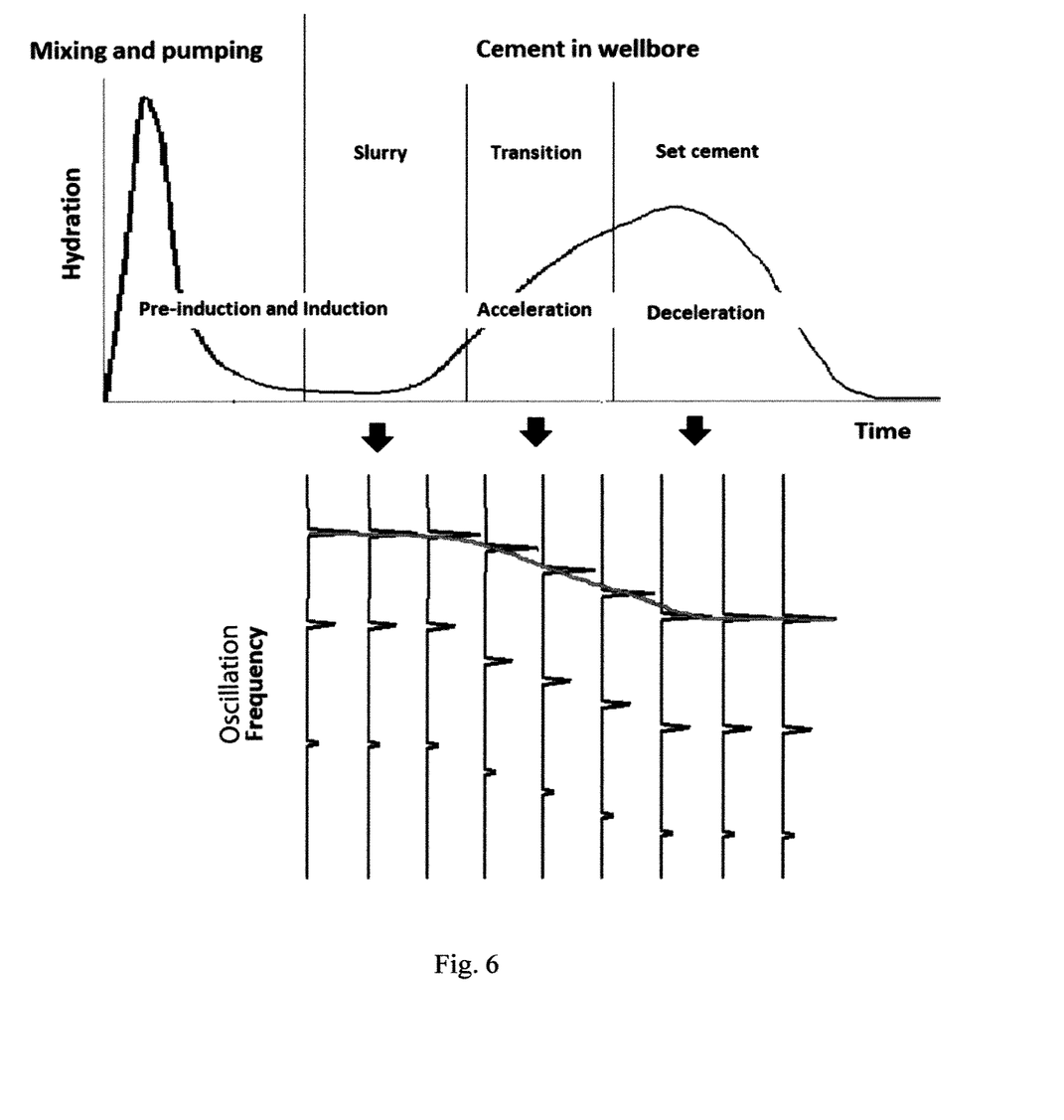
FIG. 6 is an illustration of the stages of cement hydration, coupled with how the frequency of casing oscillations changes accordingly.

Portland cement undergoes a hydration process when added to water to form a slurry. The hydration process may be divided into four principal periods: pre-induction, induction, acceleration and deceleration (FIG. 6). The pre-induction period occurs when the dry cement is first introduced to water. A strong hydration event takes place with the concurrent generation of heat. After pre-induction, a period of dormant hydration (the induction period) takes place. The slurry is in liquid form and pumpable during the induction period. Eventually the rate of hydration increases (the acceleration period), and the cement slurry viscosity increases and begins to set. This period is also known as the transition period. Finally, the rate of hydration decreases (the deceleration period) as the cement slurry hardens and develops strength.

FIG. 6 also portrays how cement setting may affect the casing oscillations detected by the vibration detector. The oscillation spectra may respond by a frequency change eventually ending at a plateau. The plateau may be evidence that the cement has set.

Figure 5:
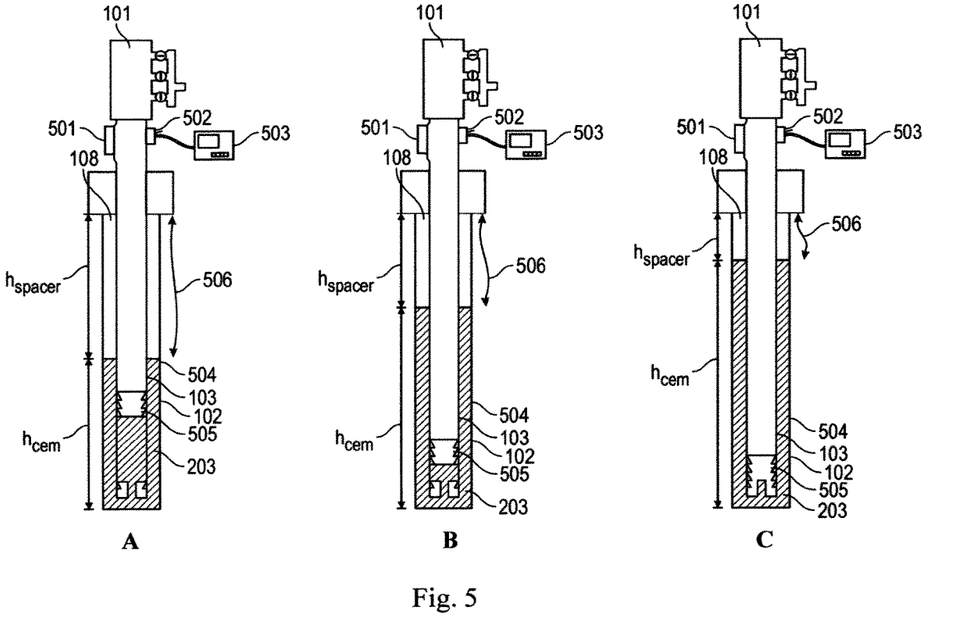
FIG. 5 is an illustration of a well configuration for practicing the disclosed methods.

In another embodiment a measurement of the casing oscillation is used for locating fluid interfaces in the annulus. It is applied for at least two fluids pumped in the annulus sequentially which may have different properties such as density, speed of sound or viscosity. A practical interest of the method is determining the TOC position in annulus during a well cementing operation, as shown in FIG. 5. Usually the spacer is pumped ahead of the cement slurry and has lower density than the cement, hence the contrast of fluid properties is created on their interface. The position of the interface of these fluids ($h_{cem}$ and $h_{spacer}$) is moving upwards while displacement and may be correlated with oscillation mode of the casing string. Along with the pumping process the height of each fluid is changing in the annulus and the fluid interface serves as a "pinch point" of the casing string (due to cement having higher density) and as a reflector for the oscillation waves propagating along the casing string. This wave may be initiated using a vibrator additionally installed at the surface part of the casing string or by nature oscillations of the casing string that are generated by the working cementing or rig pumps.

The depth to the fluid interface is calculated from the time required for the wave to travel from the surface, where an oscillation detector is installed to the fluid interface (reflection point) and back.

In one embodiment the detector is an accelerometer installed at the surface part of the casing and used to capture casing oscillation data. The method comprises placing at least two fluids into the annular space and their pumping upwards by the conventional displacement process of well cementing operations-pumping a displacement fluid through the interior space of the casing string. The fluids in annulus have different properties, for example density, viscosity or speed of sound. These fluids may be brine, water, spacer fluid, chemical wash, drilling fluid, or cement slurry. An accelerometer with data acquisition system is installed at surface part of the casing string and casing oscillations are recorded during the cementing operation. Oscillations may be caused by working pumps or additional vibrators such as hammers or piezoelectric devices installed at the casing. Then mathematical processing is applied to the data, captured by the accelerometer, oscillation wave reflections and reflection times detected from the fluid interfaces. Reflection time is obtained through cepstrum analysis of recorded data. As described in patent application WO 2018/004369, a cepstrum is the result of taking the inverse Fourier transform (IFT) of the logarithm of the estimated spectrum of a signal. The distance (H) from the detector to reflection point is calculated by the following equation.

$$H = \frac{1}{2} V \tau,$$

Where $\tau$ is reflection time and V is wave propagation velocity. V may be estimated based on the velocity that taken from measurements while cementing a previous section or a neighboring well with similar characteristics, estimated theoretically or measured by any other available method.

In another embodiment determination of the distance is performed in real time during the cement displacement process.

EXAMPLES

The following examples serve to further illustrate the disclosure.

Example 1

Figure 7:
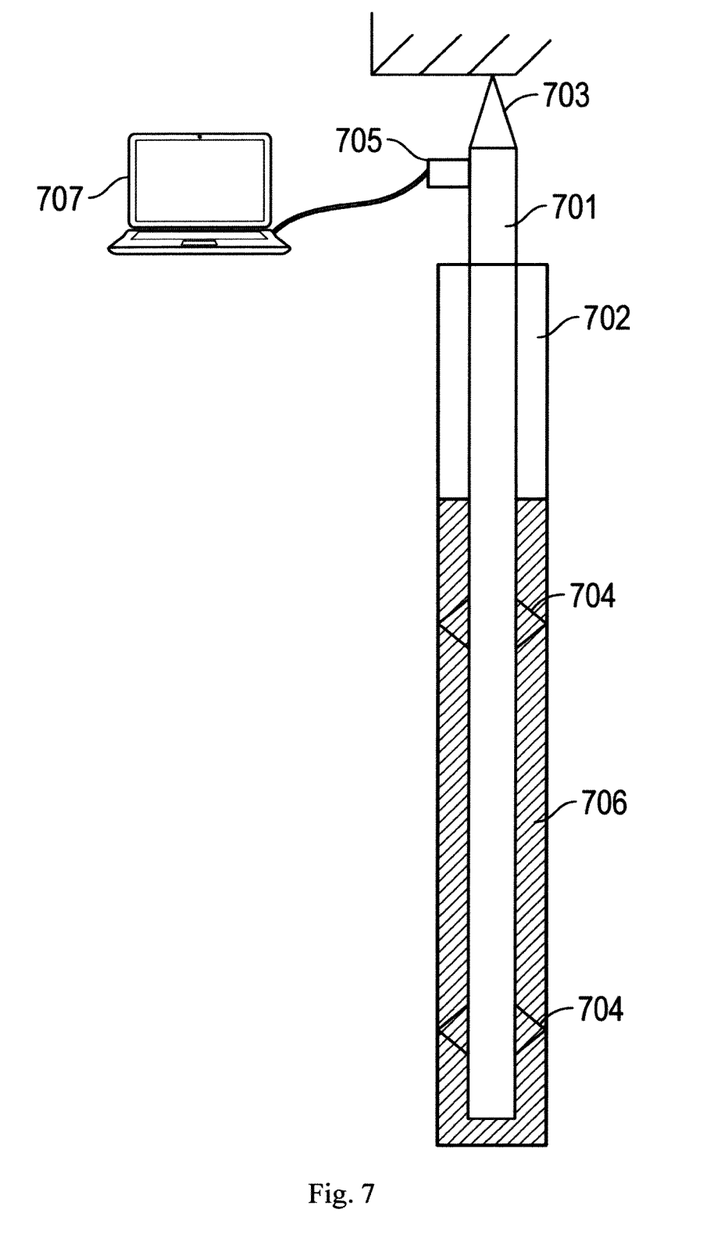
FIG. 7 is a schematic diagram of the test apparatus employed to initiate and analyze casing oscillations in order to determine cement setting time.

This example illustrates the application of the disclosed method for cement setting confirmation while cementing a subterranean well. The test setup (FIG. 7) was a steel pipe 701 with 4.5 m-length and 60-mm outside diameter that was inserted into a plastic pipe 702 with 4-m length and 100-mm inside diameter. The steel pipe was hung on a hanger 703 and was equipped with two centralizers 704 to ensure inner and outer pipe concentricity. The plastic pipe represented a wellbore and the steel pipe represented a casing string run into the well. The accelerometer 705 was installed on the top side of the steel pipe to measure its oscillations. The annular space of the setup was poured with a fast-setting slurry 706 to ¾ of its volume and then steel pipe oscillations were periodically induced using a hammer. The slurry was composed of 1.5 kg dry gypsum and 10 mL of lactic acid per liter of fresh water. Lactic acid was present as a retarder. A computer 707 analyzed the oscillations.

Figure 8:
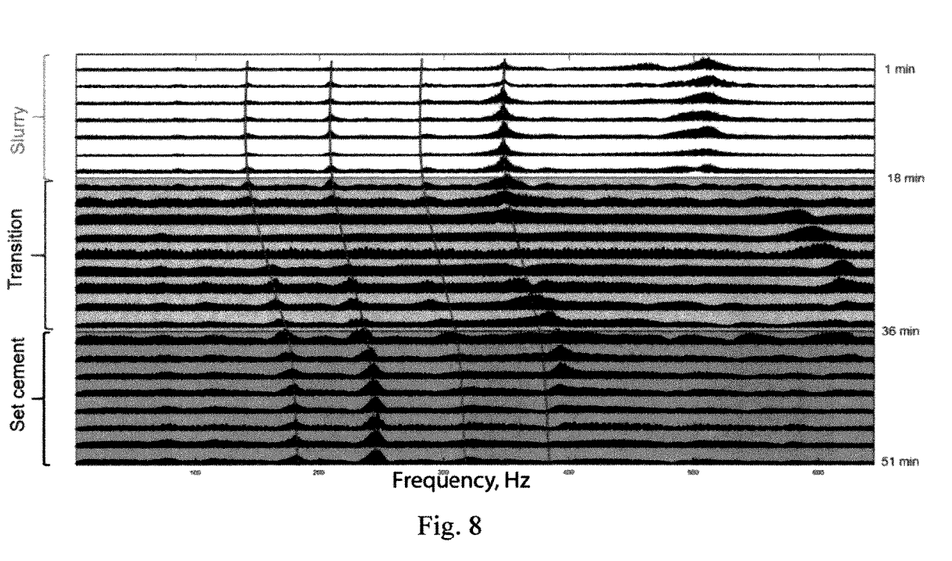
FIG. 8 illustrates oscillation frequency spectra as a function of cement slurry state in the annulus.

Oscillation frequency spectra were collected using the accelerometer and the acquisition system until the cement had fully set. The time of the cement thickening and setting was observed in parallel by analysis of its consistency in a beaker. The oscillation spectra are presented in FIG. 8. At the beginning of the experiment a few oscillation frequencies (harmonics) are clearly seen on the spectra, for example at 140, 210, 280, and 350 Hz. The spectra did not significantly change while the cement remained as a liquid slurry. When cement slurry thickening began, the frequencies rose to a range of higher values, and finally reached a plateau when cement setting has occurred (180, 250, 320, and 390 Hz correspondingly). Thus, the moment when the oscillation frequencies reach a plateau indicates the moment when the cement has set and begun developing compressive strength.

Example 2

Figure 9:
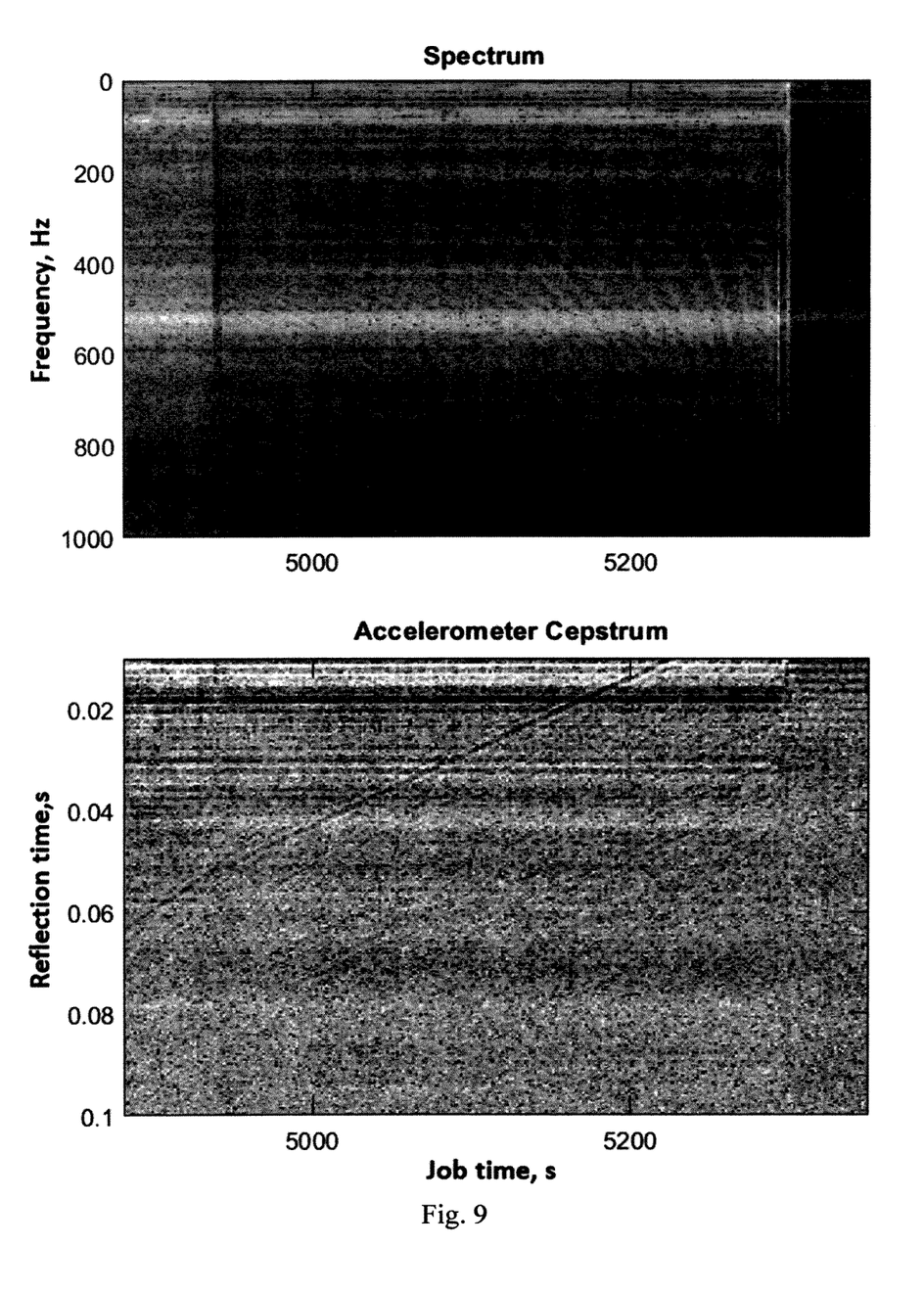
FIG. 9 illustrates raw oscillation spectra and spectra processed by cepstrum analysis.

This example illustrates a use of casing oscillation measurements for detection of top of cement (TOC) position in the annulus during a conventional well cementing operation. The casing string with OD=324 mm was run into the subterranean well at the depth of 300 m and then cemented. The accelerometer was installed on the surface part of the casing below the cement head using a magnet. Casing oscillations caused by fluid pumping were recorded with 5.12 kHz frequency during the cement displacement stage and then analyzed in correspondence to the TOC position in annulus. Data analysis represented time synchronization of the accelerometer and cementing acquisition data, application of the short-time Fourier transform (STFT) to the accelerometer data followed by cepstral processing. FIG. 9 shows the STFT spectra at the end of the cement displacement stage. The pattern in the form of the frequency shift (with many harmonics) to high values range is clearly visible on the spectrum with the cement displacement progression. However, correlation of the shift may hardly be performed with the top of cement position due complexity of the pattern and contribution of oscillation harmonics.

Figure 10:
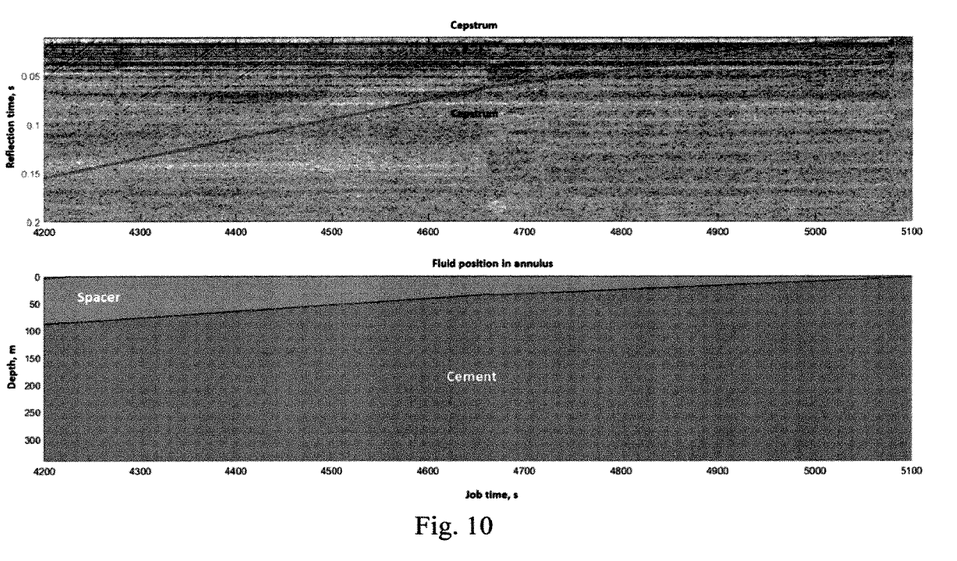
FIG. 10 illustrates the correlation between the cepstral analysis and the top-of-cement (TOC) determination.

Applying of the cepstral processing appeared to be useful in this case. On the cepstral diagram at the bottom of FIG. 10, the pattern transforms to the line in terms of reflection time value. As may be seen reflection time shifts to lower range of values as cement displacement job continues. This line is attributed to reflection from the interface between the cement slurry and the spacer fluid pumped ahead that have significant density contrast (1.80 and 1.02 g/cm$^3$, respectively). The top of cement position was then correlated with reflection time as:

$$TOC = \tfrac{1}{2} V \tau,$$

where V=1170 [m/s] is the velocity of oscillation wave propagation and $\tau$ [s] is its reflection time (the line on the cepstrum diagram). Confirmation that the reflection line corresponded to TOC was performed by correlation with the pumping rate and well geometry (i.e., the volumetric method) as well as direct visual observation. The result was plotted as a cepstral diagram (FIG. 10). It is evident that the plot fits the reflection timeline.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A method for locating fluid interfaces in a cased wellbore, comprising:
   providing a cased wellbore, thereby forming an annulus between casing and the borehole;
   pumping more than one fluid from a bottom of the annulus toward a top of the annulus creating an interface between two fluids;
   generating vibrations in the casing, thereby forming oscillations in the fluids and the casing;
   detecting the oscillations with a vibration detector;
   analyzing the oscillations with a data acquisition system; and
   performing mathematical processing of the oscillations to determine depths of the interfaces between the fluids in the annulus, wherein the mathematical processing comprises using accelerometer data, oscillation wave reflections and reflection times from the one or more fluid interfaces.

2. The method of claim 1, wherein the vibration generator comprises a pump, a hammer, or a piezoelectric transducer.

3. The method of claim 1, wherein the vibration detector is an accelerometer.

4. The method of claim 3, wherein the accelerometer operates at a frequency range between 1 Hz and 5.12 kHz.

5. The method of claim 3, wherein the accelerometer has one or more components.

6. The method of claim 1, wherein the interface is formed between two fluids having a difference in at least one of density, speed of sound, or viscosity.

7. The method of claim 1, wherein the generation of vibrations is performed continuously or periodically.

8. The method of claim 1, wherein the fluids comprise brine, water, spacer fluid, chemical wash, drilling fluid, or cement slurry.

9. The method of claim 1, wherein the reflection times are obtained through cepstrum analysis of recorded data, wherein a cepstrum is a result of taking an inverse Fourier transform of a logarithm of an estimated spectrum of a signal.

10. A method of cement-setting-time determination, comprising:
    providing a cased wellbore, thereby forming an annulus between the casing and the borehole;
    pumping more than one fluid with an interface between two fluids from a bottom of the annulus toward a top of the annulus, wherein one of the fluids is a cement slurry;
    generating vibrations in the casing, thereby forming oscillations in the fluids and the casing;
    detecting the oscillations with a vibration detector comprising an accelerometer;
    analyzing the oscillations with a data acquisition system; and
    performing mathematical processing of the oscillations to determine when the cement slurry has set, wherein the mathematical processing comprises using accelerometer data and obtaining frequency spectra.

11. The method of claim 10, wherein the vibration generator comprises a pump, a hammer, or a piezoelectric transducer.

12. The method of claim 10 wherein the generation of vibrations is performed continuously or periodically.

13. The method of claim 10, wherein another fluid of the more than one fluid comprises brine, water, spacer fluid, chemical wash, or drilling fluid.

14. The method of claim 10, wherein an oscillation frequency changes as the cement slurry sets and hardens.

* * * * *